(12) United States Patent
Höβle

(10) Patent No.: US 9,895,929 B2
(45) Date of Patent: Feb. 20, 2018

(54) SYSTEM AND METHOD OF ACQUIRING AND EVALUATING A MEASURAND

(71) Applicant: SAF-HOLLAND GmbH, Bessenbach (DE)

(72) Inventor: Florian Höβle, Bessenbach (DE)

(73) Assignee: SAF-HOLLAND GmbH, Bessenbach (DE)

(*) Notice: Subject to any disclaimer, the term of this patent is extended or adjusted under 35 U.S.C. 154(b) by 0 days.

(21) Appl. No.: 14/851,713

(22) Filed: Sep. 11, 2015

(65) Prior Publication Data

US 2016/0076948 A1    Mar. 17, 2016

(30) Foreign Application Priority Data

Sep. 12, 2014  (DE) .................. 10 2014 218 370

(51) Int. Cl.
| | | |
|---|---|---|
| *B60Q 1/00* | (2006.01) | |
| *B60B 27/00* | (2006.01) | |
| *G01K 13/08* | (2006.01) | |
| *F16C 19/52* | (2006.01) | |

(52) U.S. Cl.
CPC .......... *B60B 27/0068* (2013.01); *G01K 13/08* (2013.01); *F16C 19/525* (2013.01)

(58) Field of Classification Search
CPC ... B60B 27/0068; G01K 13/08; F16C 19/525; B60C 23/0408; B60C 23/0455; B60C 23/0433; B60C 23/009; G07C 5/008
USPC .................................. 340/442–449; 73/146.5
See application file for complete search history.

(56) References Cited

U.S. PATENT DOCUMENTS

| | | | | |
|---|---|---|---|---|
| 4,970,491 | A * | 11/1990 | Saint ....................... | B60C 23/02 340/447 |
| 5,825,286 | A * | 10/1998 | Coulthard ............... | B60C 23/00 340/447 |
| 7,271,733 | B2 | 9/2007 | Nicot et al. | |
| 2002/0167401 | A1 | 11/2002 | Hayes | |
| 2003/0074961 | A1* | 4/2003 | Fischer ............... | B60C 23/0408 73/146 |
| 2004/0150516 | A1* | 8/2004 | Faetanini ................ | B60C 23/00 340/444 |
| 2007/0152107 | A1* | 7/2007 | LeFebvre .................. | B61L 3/00 246/169 R |
| 2009/0033510 | A1 | 2/2009 | Izumi et al. | |
| 2009/0284362 | A1 | 11/2009 | Wilson et al. | |
| 2012/0032793 | A1 | 2/2012 | Sonzala et al. | |
| 2013/0038436 | A1 | 2/2013 | Brey et al. | |

(Continued)

FOREIGN PATENT DOCUMENTS

| | | |
|---|---|---|
| DE | 10004464 | 10/2000 |
| DE | 10242199 | 3/2004 |
| WO | 9806078 | 2/1998 |

*Primary Examiner* — Anh V La
(74) *Attorney, Agent, or Firm* — Price Heneveld LLP

(57) ABSTRACT

The present invention relates to a system and a method for acquiring and evaluating a measurand, in particular a temperature, of at least one component of a vehicle, in particular a wheel bearing, comprising at least one sensor for acquiring a measurand, in particular a temperature of at least one component, in particular of a wheel bearing of the vehicle, and for outputting an output parameter, and least one evaluation device for evaluating the output parameter, and for generating a warning signal in dependence on the evaluation of the output parameter on the basis of at least one defined warning criterion.

21 Claims, 3 Drawing Sheets

(56) References Cited

U.S. PATENT DOCUMENTS

2013/0234847 A1    9/2013   Carson et al.
2014/0309860 A1   10/2014   Paulin et al.

* cited by examiner

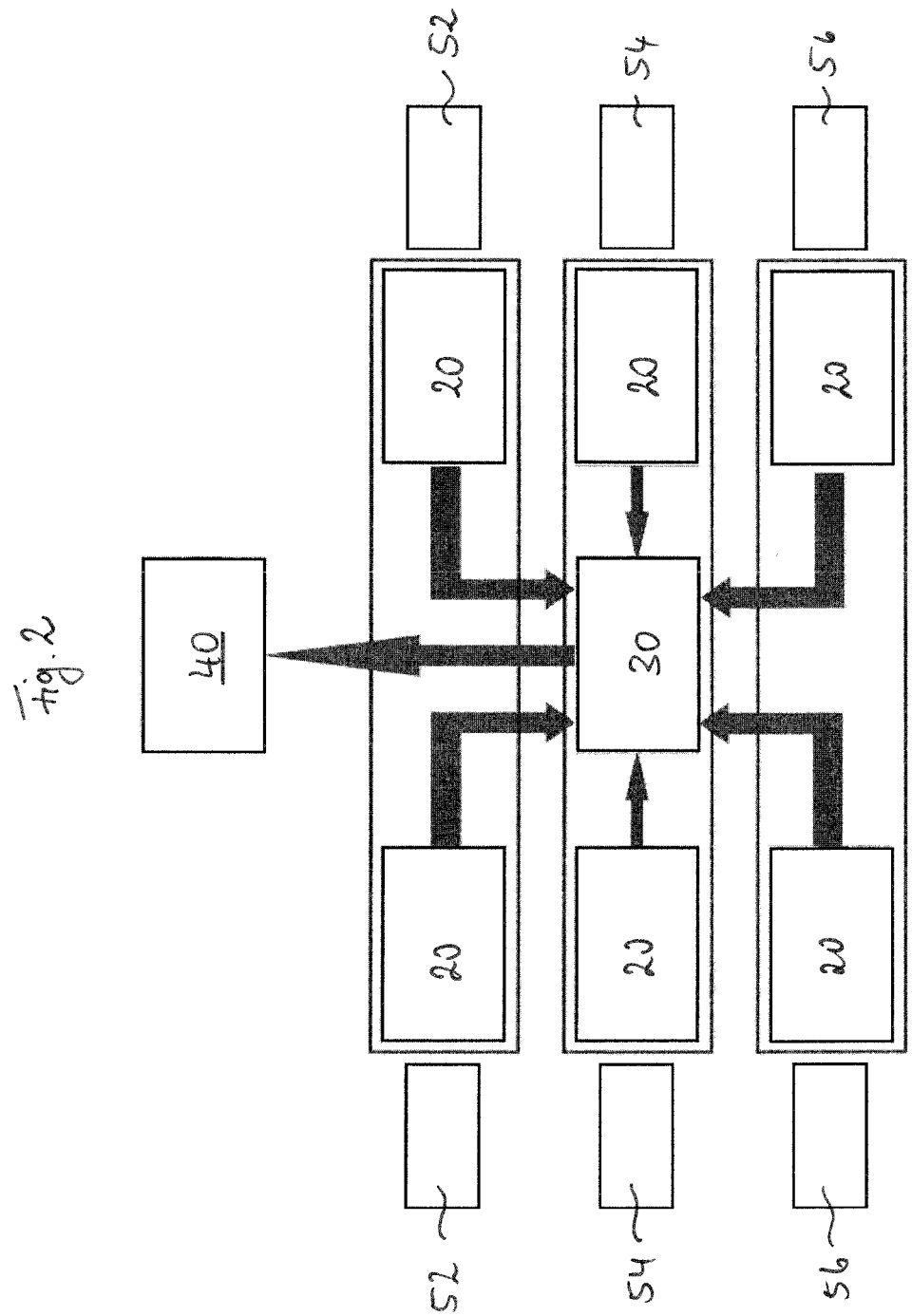

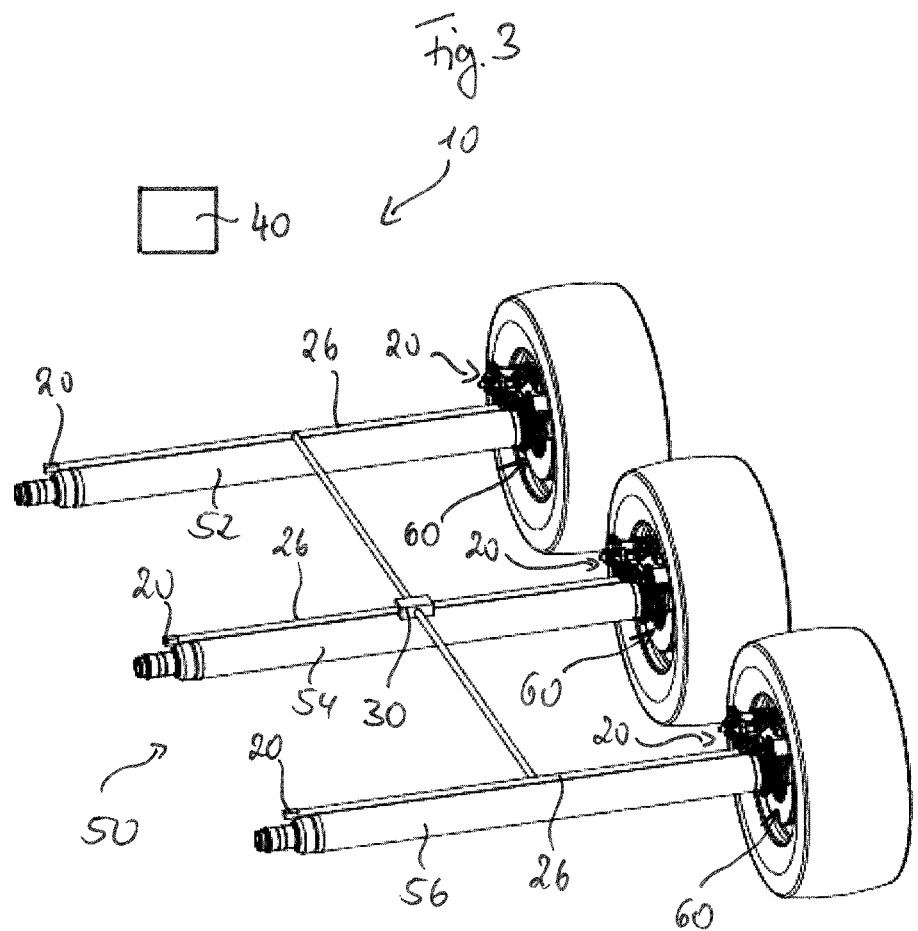

SYSTEM AND METHOD OF ACQUIRING AND EVALUATING A MEASURAND

BACKGROUND OF THE INVENTION

The invention relates to a system and a method of acquiring and evaluating a measurand of at least one component of a vehicle. In particular, the invention relates to a system and a method of acquiring and evaluating a temperature of at least a wheel bearing of a vehicle.

The temperature development of a wheel bearing is an essential indicator of the functional state of the bearing. For example, an increase in temperature is often an early indicator for the failure of a wheel bearing. Thus, a suitable means of checking the functioning and, thus, the operational reliability of the wheel bearing is to check the temperature of the wheel bearing at regular intervals.

In the prior art, for monitoring a wheel bearing temperature, melting temperature indicators are known, for example. The melting temperature indicators are built up such that, when a defined temperature is exceeded, one component melts so that the color of the indicator changes. When the component melts, its white surface turns black, for example. Thus, it is possible to determine whether a certain temperature is being exceeded at the measuring point.

The object underlying the invention is to provide a system and a method ensuring or allowing that a malfunction of a vehicle component, in particular of a wheel bearing is particularly reliably recognized.

SUMMARY OF THE INVENTION

The system according to the invention for acquiring and evaluating a measurand, in particular a temperature of at least one component of a vehicle, in particular a wheel bearing comprises the following components: at least one sensor for acquiring a measurand, in particular a temperature of at least one component of the vehicle, in particular of a wheel bearing of the vehicle, and for outputting an output parameter, and at least one evaluation device for evaluating the output parameter, and for generating (triggering) a warning signal in dependence on the evaluation of the output parameter on the basis of at least one defined warning criterion.

The method according to the invention of acquiring and evaluating a measurand, in particular a temperature of at least one component, in particular a wheel bearing of a vehicle comprises the following steps: acquiring a measurand, in particular a temperature of at least one component, in particular a wheel bearing of the vehicle, and outputting an output parameter; evaluating the output parameter, and generating a warning signal in dependence on the evaluation of the output parameter on the basis of at least one defined warning criterion.

The method according to the invention may be carried out in particular with a system according to the invention. In particular, the system according to the invention is provided and suitable for carrying out the method according to the invention.

A basic concept of the invention, apart from merely acquiring a measurand, is to provide an evaluation of the measurand and, based on the evaluation, to emit a warning when at least one predefined warning criterion is fulfilled. Here, the measurand may preferably refer to a temperature, wherein, however, also other measurands, such as the inflation pressure of a vehicle tire may be taken into account. Thus, one aspect of the invention, in order to check the functioning of a wheel bearing, apart from merely acquiring the temperature, is in particular to evaluate the temperature and, on the basis of the evaluated measurand, when at least one predefined and preferably adjustable or variable warning criterion is fulfilled, to automatically emit a warning. Therefore, it is not required that a driver manually checks the temperature measuring device at regular intervals. Rather, the evaluation device automatically alerts the driver or, possibly, another person to a warning situation. The operational reliability of the vehicle is increased due to the automatic recognition and signaling of a warning situation. In the sense of the present invention, evaluation means in particular a single or repeated comparison between the measurand (in particular the temperature) and a reference value and/or a comparison between a temporal measurand course and a temporal reference value course. Basically, also a comparison between a spatial temperature distribution and a reference value is conceivable, in that the output parameters of several temperature sensors are evaluated. Here, the reference value or reference value course may preferably be adjusted or varied by a user, in particular electronically, or be calculated automatically by the system based on predetermined input values. Furthermore, it is preferred that the evaluation is based on at least two comparisons (i.e. at least two comparisons are made), such as two temporally subsequent comparisons between individual measurands and one reference value or several reference values. Thus, a first measured value of the temperature may be compared to a reference value, temporally subsequently a second value of the temperature may be compared to a reference value and, based thereon or possibly further comparisons a yes/no decision may automatically be taken on whether a warning is triggered or not.

In a preferred embodiment of the invention, the evaluation device is adapted to carry out a comparison between at least one value of the output parameter (measurand) and a comparison or reference value. The evaluation device thus receives an output parameter from the sensor (transmitter), such as a temperature or a temperature course. In the evaluation device, a comparative value may be stored, such as a given temperature limit or a temperature course, which is characteristic of a malfunction of the wheel bearing. The temperature limit or the characteristic temperature course then represents a comparative value. Based on the comparison between a value, or a property, of the output parameter and a comparative value, the warning signal is generated or not generated.

In a further preferred embodiment, the evaluation device is adapted to generate a warning signal, when the acquired measurand, in particular the temperature exceeds a predetermined limit, in particular a temperature limit. The warning criterion is thus that a certain absolute temperature is exceeded at the measuring point.

In a further preferred embodiment, the evaluation device is adapted to generate a warning signal, when the acquired measurand, in particular the temperature exceeds a predetermined value, in particular a temperature limit several times or over a predetermined minimum period of time. This is based on the understanding that an only short-lived steep increase in the temperature of the wheel bearing usually does not mean a defect in the wheel bearing, but may be due to the operational situation. For example, an emergency braking will lead to a steep increase in the temperature of the wheel bearing and usually does not indicate excessive wear or a malfunction of the wheel bearing. Only in case the temperature limit is exceeded several times or over a longer period of time, a damage to the wheel bearing has to be assumed so that the system emits a warning. According to a further preferred embodiment, the evaluation device is adapted to generate the warning signal when a certain predetermined characteristic measurand course, in particular temperature course is recognized. Such a characteristic measurand course may be the temporal change in the measurand or a temporal temperature course, for example. A certain temporal temperature course may be characteristic of a damage to the wheel bearing, for example. A characteristic temperature course may be a corridor of a temporal change in the wheel bearing temperature, for example. In a further preferred embodiment of the invention, the evaluation device is adapted to generate the warning signal when a predetermined or definable deviation from a calculated measurand course, in particular temperature course is exceeded. For example, the temperature course, i.e. the temporal change in the temperature (wheel bearing temperature) may be calculated taking into account disturbance values (e.g. alternatively or at least partially cumulatively brake disc temperature, brake lining temperature, air velocity, ambient temperature, brake actuation). This calculated temperature course is then compared to the actually measured temperature course. In the case of a deviation, which is regarded as excessive, a warning is given.

Preferably, the system contains in particular an optical and/or acoustic warning device adapted to emit an optical and/or acoustic warning, for example, based on the warning signal generated by the evaluation device (signaling a warning situation, such as to the driver of the vehicle or to another person). The warning device may have a transparent cut-out in the area of the wheel, for example, in particular a hubcap, which may be backlit. Thus, for example, an illumination device, which is in particular fixed (non-rotating), may be arranged in the area of an axle, which is in particular fixed, so that the transparent cut-out in the hubcap is backlit. An optical fiber may be mounted in a stationary manner and illuminate or backlit a part or all of the hubcap. The warning device may have a warning element, in particular an optical warning element, integrated into the hubcap, wheel hub or rim. Additionally or alternatively, another discernible warning, such as an acoustic warning, may be emitted. The warning is in particular given when the defined warning criteria are exceeded.

Preferably, there is at least one first transmission device for transmitting the output parameter from the sensor to the evaluation device. The transmission device may have a cable or a transmission module, for example, for wireless data transmission.

Furthermore, it is preferred that there is at least a second transmission device for transmitting data between the evaluation device and the warning device. The communication between the evaluation device and the warning device (e.g. a display) may be wireless (e.g. Bluetooth, ZigBee), for example. It is also possible that the communication is done by means of a bus system (e.g. CAN bus). In a further embodiment, the communication between the evaluation device and the warning device is done by means of a data line. In particular, the communication may also be bidirectional such that an acknowledgment of the warning is fed back from a user to the evaluation device. In a particularly preferred embodiment, the communication between the evaluation device and the warning device is by means of an electronic braking system (EBS), which is already being installed in a large number of vehicles. In an electronic braking system, the brake cylinders are controlled by means of electronic signals. The brake cylinders then provide the required brake pressure according to the received control signals. The desire to slow down will then be indicated by the driver by actuating the brake and electronically fed on to the further components of the brake system, in particular the brake cylinder. According to the invention, the communication system of the electronic brake system may also be used for the communication between the evaluation device and the warning device.

The warning device, or the signaling device, may be firmly integrated into the vehicle, e.g. a tractor truck of a utility vehicle or commercial vehicle. The warning device may comprise an indicating device, e.g. a display, and/or an input device, such as keys, control wheels or a touch-pad.

It is advantageous that the at least one sensor of the system is arranged in the area of an axle head. The axle head, i.e. the axial end of the in particular fixed vehicle axle, is in a close spatial relationship with the wheel bearing so that a precise acquisition of the wheel bearing temperature may be achieved. The sensor may thus be arranged additionally on a stationary (non-rotating) component, which will also greatly reduce the installation and maintenance work. Basically, it is also possible to arrange the sensor at any position on the axle and to correct the measured temperature on the basis of the distance from the wheel bearing (heat losses).

The at least one evaluation device of the system is preferably arranged on or along the axle of the vehicle, in particular in the area of the axle head. Alternatively, the evaluation device may be attached also at the trailing arm of the vehicle, for example. The sensor and/or the evaluation device may be attached at the axle head for example, e.g. at an axle nut.

A further embodiment of the invention provides for several sensors, which are each arranged in the area of a respective axle head, for example, and that an evaluation device and/or a warning device is attributed to each sensor. Here, the individual sensors are preferably attributed to wheel bearings of their own or axles or axle systems of their own. In this decentralized basic approach, the temperature is acquired and measured and displayed (warning) on the wheel bearings, axle or axle systems independent of each other. In this approach, the signaling of the warning is preferably done by means of a display in the area of the respective wheel, in particular at a hubcap, wheel hub or rim.

In a further preferred embodiment, there are provided several sensors, which may be arranged in the respective area of an axle head, for example, wherein there is provided a central warning device adapted to emit warnings in relation to the sensors. In this centralized approach, thus, the measurand is acquired preferably in a decentralized manner (e.g. at several axle heads). The evaluation devices may also be arranged in a decentralized manner, such as on the axle heads. Alternatively, there may be provided a centralized evaluation device, which receives and evaluates the output parameters of the sensors. The centralized warning device receives either the warning signals of the decentralized evaluation devices or a warning signal generated by the centralized evaluation device, and it is preferably arranged away from the wheels at a central position of the vehicle (such as in or at the driver's cabin), of the trailer or away from the vehicle or trailer (strategically favorable or easily accessible site).

It is preferred that a triggered warning signal remains permanently stored in a memory or may be deleted or erased only after authorization by an authorized person. For example, a triggered warning signal may be kept permanently in an unerasable memory. Alternatively, it is possible that a triggered warning signal may be deleted by the driver or any other person. To this end, it is possible to integrate safety measures into the system in order to put a restriction on the group of people. For example, it may be required to enter a code or an authentication in order to delete the warning signal. It is also possible that, although the warning (e.g. an acoustic/optical warning) may be switched off (deleted), the (electrical) warning signal underlying the warning, however, remains stored in the system. The warning may be deleted/reset by means of an input device (e.g. key) integrated into the system, for example. It is also conceivable to delete/reset the warning by means of wireless communication, in particular a remote control.

BRIEF DESCRIPTION OF THE DRAWINGS

Hereinafter, the invention will be described in more detail on the basis of preferred embodiments shown in the attached schematic Figures. The Figures show:

FIG. 2: shows a schematic representation of a second embodiment of the invention; and FIG. 3: shows an axle system of a vehicle with an embodiment according to the invention for acquiring and evaluating a wheel bearing temperature.

DETAILED DESCRIPTION OF THE PREFERRED EMBODIMENTS

Figure 1:
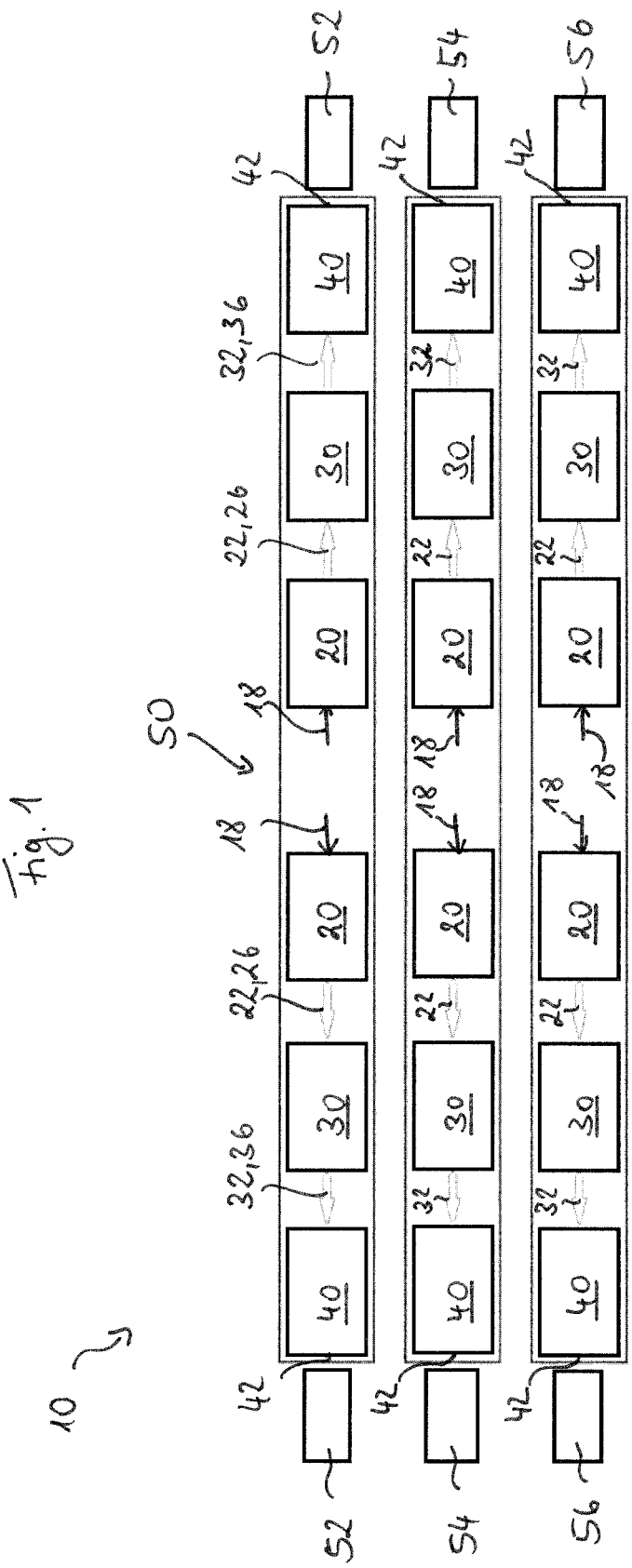
FIG. 1: shows a schematic representation of a first embodiment of the invention.

The same reference signs are used in all Figures to designate the same or analogous components.

FIG. 1 shows a first embodiment of a system 10 for acquiring and evaluating a wheel bearing temperature at an axle system 50. The axle system 50, which is shown in a highly abstract manner, comprises a first axle 52, a second axle 54 and a third axle 56. The system 10 for acquiring and evaluating a wheel bearing temperature is arranged on the axle system 50. The system 10 comprises several sensors 20 for temperature acquisition. The sensors 20 are each arranged in the area of a wheel bearing 60 (cf. FIG. 3) at an axial end of the respective axle. In the case shown, with three axles and six wheel bearings, there are provided six sensors 20. Basically, it is however possible to arrange additional sensors. As a matter of course, the number of axles as well as the number of wheels per axle may also be greater or smaller.

The sensors 20 (transducers) acquire a temperature as an input value 18 and output an electrical output parameter 22 in response to the input value 18. The sensors 20 may be designed as semiconductor elements (semiconductor temperature sensors) or as thermal elements, for example. The output parameter 22 may be an electric current, an electric voltage or a digital signal, for example. The output parameter 22 is transmitted to an evaluation device 30, such as a control device. To this end, there are provided first transmission devices 26, such as electric cables or data cables. The evaluation device 30 evaluates the output parameter 22 in that, for example, it compares the measured temperature value and predefined reference values or a measured temperature course (temporal change in the temperature) and a predefined or calculated temperature course.

As a final result of this comparison, the evaluation device 20 triggers a warning signal 32 if a warning situation is recognized as a result of this comparison. The warning signal 32 is transmitted by means of a second transmission device 36 to a warning device 40, such as an illumination device, a display or an acoustic warning element. The warning device 40 will then emit a warning 42, in particular an optical and/or acoustic warning, which is discernible by a person. The system 10 shown comprises for each wheel bearing 60 its own measurement chain from the acquisition of the temperature to the evaluation and warning. The individual sensors 20, evaluation devices 30 and warning devices 40 are preferably arranged along the respective axles 52, 54 and 56, wherein the in particular optical warning device 40 is provided at the respective outer ends of the axle so that it may be noticed by a user (person) in the area of the wheel, in particular at a hubcap.

FIG. 2 shows a second embodiment of a system 10 for acquiring and evaluating a wheel bearing temperature at an axle system 50. The respective sensors 20 are arranged in the area of the individual wheel bearings 50 at an axle, in particular at the axle head, as is the case in the embodiment of FIG. 1. The output parameters 22 are transmitted to a centralized evaluation device 30, such as a control device, by means of respective transmission devices 26. The centralized evaluation device evaluates the acquired temperatures and emits a warning signal 32 when there is a warning situation for at least one wheel bearing 60. The warning signal 32 is transmitted to an optical and/or acoustic warning device 40 by means of a second transmission device 36. The warning device 40 may be a display arranged in a driver's cabin, for example. The warning device 40 triggers a warning, such as an acoustic and/or optical warning.

FIG. 3 shows an axle system 50 of a vehicle, in particular of a utility vehicle, having a system 10 arranged thereon, which is configured according to FIG. 2 (centralized approach). The sensors 20 for temperature acquisition are located in the area of the respective axle heads of the axles 52, 54, 56. The respective acquired temperatures are transmitted by means of first transmission devices 26 as output parameters 22 to a centralized evaluation device 30 mounted on one of the axles 52, 54, 56. The evaluation device 30 transmits the possibly generated warning signal 32, for example in a wireless manner, by means of a second transmission device 36 to a warning device 40, such as a display in the driver's cabin. For the sake of clarity, the left-hand wheels of the axle system 50 are not shown in FIG. 3.

The basic concept underlying the invention of acquiring and evaluating a measurand and signaling a warning situation to a driver or another person may, for example, also relate to other measurands apart from the wheel bearing temperature, such as the inflation pressure. On the whole, by evaluating the measurand according to the invention by means of one centralized or several decentralized control devices, the temperature is not only acquired and displayed, but additionally a warning situation is recognized and signaled by a warning. The warning situation may thus be discerned by a user almost without delay.

The invention claimed is:

1. A system for acquiring and evaluating a temperature of a wheel bearing, comprising:
   at least one sensor for acquiring a temperature of the wheel bearing of a vehicle, and for outputting an output parameter; and
   least one evaluation device for evaluating the output parameter, and for generating a warning signal in dependence on the evaluation of the output parameter on the basis of at least one defined warning criterion;
   wherein the evaluation device is adapted to generate the warning signal when at least one of a predetermined temperature course is recognized, and a predetermined deviation from a calculated measurand temperature course is exceeded; and wherein a central warnings device is configured to emit warnings in relation to the sensors.

2. The system of claim 1, wherein the evaluation device is configured to make a comparison between at least one value of the output parameter and a comparative value.

3. The system of claim 2, wherein the evaluation device is adapted to generate the warning signal when at least one of the acquired temperature exceeds a predetermined temperature limit, and the acquired temperature exceeds the predetermined temperature limit several times or over a predetermined minimum period of time.

4. The system of claim 3, wherein the system contains at least one of an optical warning device and an acoustic warning device adapted to output a warning based on a warning signal generated by the evaluation device.

5. The system of claim 4, wherein at least one transmission device for transmitting data between the evaluation device and the warning device is provided.

6. The system of claim 5, wherein an electronic brake system is provided that transmits data between the evaluation device and the warning device.

7. The system of claim 6, wherein the at least one sensor of the system is arranged in the area of an axle head.

8. The system of claim 7, wherein the sensor is fixed in a stable manner with respect to a stationary axle.

9. The system of claim 8, wherein the at least one evaluation device of the system is arranged in the area of the axle head.

10. The system of claim 9, wherein the at least one sensor includes several sensors and wherein at least one of the evaluation device and the warning device is attributed to each sensor.

11. The system of claim 10, wherein a triggered warning signal remains permanently stored in a memory or may be deleted only after authorization by an authorized person.

12. The system of claim 1, wherein the evaluation device is adapted to generate the warning signal when at least one of the acquired temperature exceeds a predetermined temperature limit, the acquired temperature exceeds the predetermined temperature limit several times or over a predetermined minimum period of time, a particular temperature course is recognized, and the predetermined deviation from a calculated measurand temperature course is exceeded.

13. The system of claim 1, wherein the system contains at least one of an optical warning device and an acoustic warning device adapted to output a warning based on a warning signal generated by the evaluation device.

14. The system of claim 13, wherein at least one transmission device for transmitting data between the evaluation device and the warning device is provided.

15. The system of claim 13, wherein an electronic brake system is provided that transmits data between the evaluation device and the warning device.

16. The system of claim 1, wherein the at least one sensor of the system is arranged in the area of an axle head.

17. The system of claim 16, wherein the sensor is fixed in a stable manner with respect to a stationary axle.

18. The system of claim 1, wherein the at least one evaluation device of the system is arranged in the area of an axle head.

19. The system of claim 1, wherein the at least one sensor includes several sensors and wherein at least one of the evaluation device and the warning device is attributed to each sensor.

20. The system of claim 1, wherein a triggered warning signal remains permanently stored in a memory or may be deleted only after authorization by an authorized person.

21. A method of acquiring and evaluating a temperature of a wheel bearing of a vehicle, comprising:
    acquiring a temperature of the wheel bearing of the vehicle;
    outputting an output parameter;
    evaluating the output parameter; and
    generating a warning signal in dependence on the evaluation of the output parameter on the basis of at least one defined warning criterion, wherein the warning signal is generated when at least one of a predetermined temperature course is recognized, and a predetermined deviation from a calculated measurand temperature is exceeded; and
    wherein a central warning device is configured to emit warnings in relation to the warning signal.

* * * * *